United States Patent
Chen et al.

(10) Patent No.: US 8,085,914 B1
(45) Date of Patent: *Dec. 27, 2011

(54) REAL-TIME NETWORK TRAFFIC VIEW

(75) Inventors: Min-Hsuan Chen, Colts Neck, NJ (US);
Richard Chiang, Freehold, NJ (US);
Christopher Kwan, Marlboro, NJ (US);
Stephen R. Lang, Hopatcong, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1229 days.

This patent is subject to a terminal disclaimer.

(21) Appl. No.: 10/294,284

(22) Filed: Nov. 14, 2002

(51) Int. Cl.
*H04M 15/00* (2006.01)

(52) U.S. Cl. .................. 379/133; 379/112.07

(58) Field of Classification Search ........... 379/112.01, 379/112.05–112.08, 115.01, 115.03, 126, 379/133–140
See application file for complete search history.

(56) References Cited

U.S. PATENT DOCUMENTS

| | | | |
|---|---|---|---|
| 5,437,009 A * | 7/1995 | Lane | 345/636 |
| 5,459,777 A * | 10/1995 | Bassa et al. | 379/133 |
| 5,610,915 A * | 3/1997 | Elliott et al. | 370/259 |
| 5,862,244 A | 1/1999 | Kleiner | |
| 6,351,453 B1 | 2/2002 | Nolting | |
| 6,430,394 B1 | 8/2002 | Boyden | |
| 6,721,405 B1 | 4/2004 | Nolting | |
| 6,744,866 B1 * | 6/2004 | Nolting et al. | 379/133 |
| 6,785,240 B1 | 8/2004 | Cao | |
| 7,065,194 B1 * | 6/2006 | Chen et al. | 379/133 |
| 2003/0214913 A1 | 11/2003 | Kan | |
| 2003/0229613 A1 * | 12/2003 | Zargham et al. | 707/1 |

* cited by examiner

*Primary Examiner* — Quoc D Tran

(74) *Attorney, Agent, or Firm* — Akerman Senterfitt; Michael K. Dixon; Mammen P. Zachariah, Jr.

(57) ABSTRACT

At least one exemplary embodiment of the present invention includes a method, comprising requesting real-time measurement data for a telephone network between a transit carrier and a predetermined terminating carrier; and automatically receiving the real-time measurement data via the Internet at an originating carrier associated with the transit carrier. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope.

27 Claims, 5 Drawing Sheets

REAL-TIME NETWORK TRAFFIC VIEW

BACKGROUND

In many cases, most and/or all telephone calls destined for particular country, state, political region, and/or geographical region are delivered to the called party by a single terminating carrier to which an originating carrier can connect via any of several transit carriers. Similarly, electricity, gas, fuel, steam, and/or water can be provided by a terminating carrier that connects to an end user, that terminating carrier supplied by one or more originating and/or transit carriers.

SUMMARY

At least one exemplary embodiment of the present invention includes a method comprising automatically obtaining real-time measurement data for a telephone network between a transit carrier and a predetermined terminating carrier, and automatically providing the real-time measurement data via the Internet to an originating carrier associated with the transit carrier.

At least one exemplary embodiment of the present invention includes a method comprising requesting real-time measurement data for a telephone network between a transit carrier and a predetermined terminating carrier, and automatically receiving the real-time measurement data via the Internet at an originating carrier associated with the transit carrier.

At least one exemplary embodiment of the present invention includes a graphical user interface comprising a rendering of real-time measurement data for a telephone network between a transit carrier and a predetermined terminating carrier, said rendering updated via an Internet connection at a predetermined time interval.

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

According to an exemplary embodiment of a method of the present invention, one or more metrics that relate to capacity and/or traffic for telephone calls can be provided to the originating, transit, and/or terminating carrier. In certain embodiments, "real-time" measurement data can be provided. Such data can be of interest, for example, to an originating carrier in determining and/or selecting transit carriers and/or in switching traffic between various transit carriers. As another example, such data can be of interest to a carrier in determining rates.

In an exemplary embodiment, a request for real-time measurement data can be made by the originating carrier. This request can be entered by the originating carrier via an information device that is connected via a network to a data server, such as a web server, that provides the real-time measurement data. The request can be entered via a graphical user interface, such as a web browser, via which the originating carrier can specify the real-time measurement(s), transit carriers, terminating carriers, countries, and/or regions of interest. The graphical user interface can provide user interface elements, such as menus, pick lists, check boxes, buttons, hyperlinks, etc., that can facilitate the entry of the request. For example, the graphical user interface can provide a pick list of countries of interest. As another example, the graphical user interface can provide an array of check boxes via which the originating carrier can selected from among multiple potential real-time measurements (such as number and/or percent of links and/or circuits that are idle, available, utilized, overflowed, served by a particular technology (e.g., copper, satellite, fiber, radio, cellular, microwave, POTS, X.25, ISDN, ATM, and/or Voice-over-IP, etc.), and/or busy due to maintenance, etc.).

Figure 1:
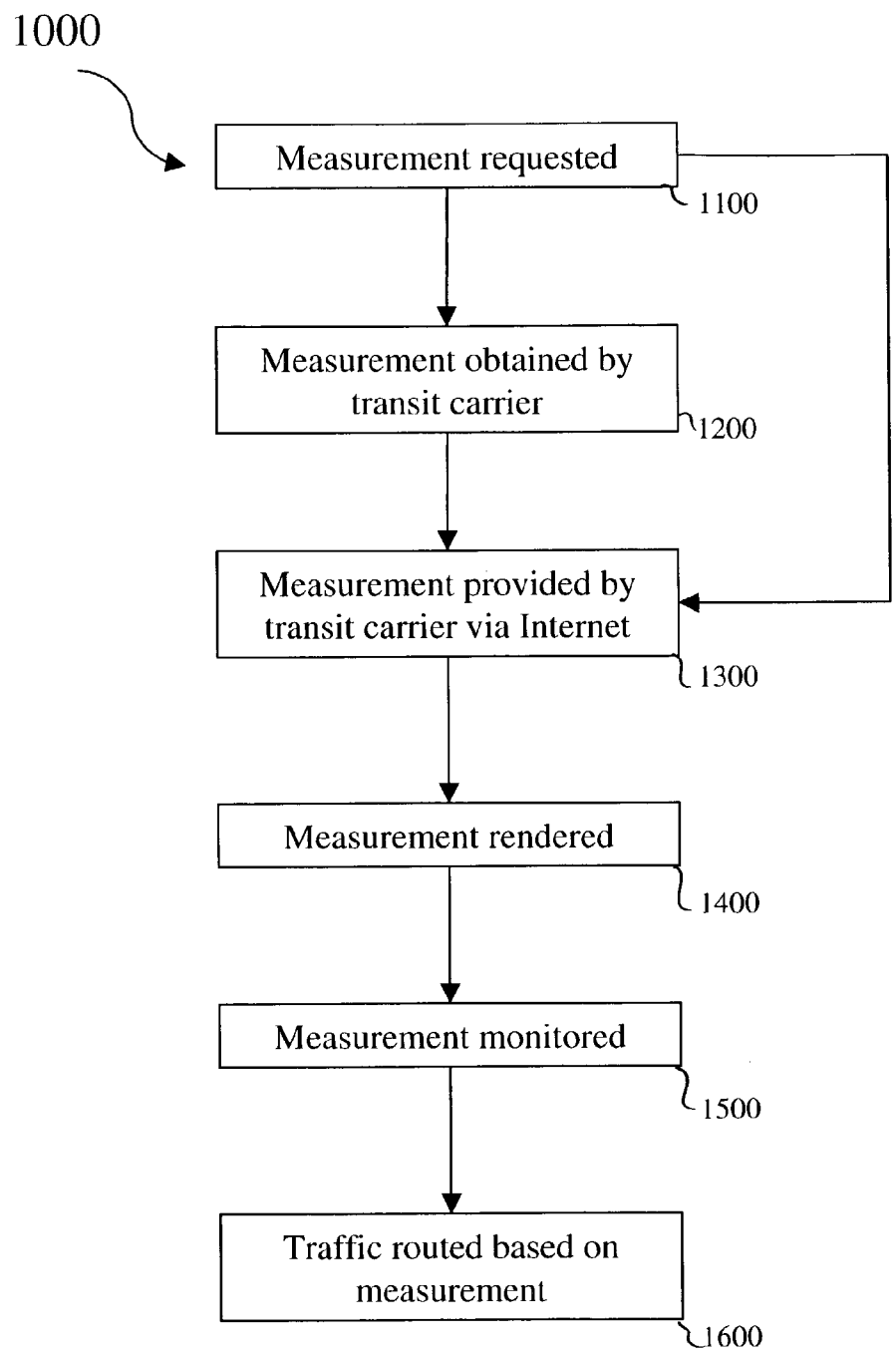
FIG. 1 is a flow diagram of an exemplary embodiment of a method 1000 of the present invention.

FIG. 1 is a flow diagram of an exemplary embodiment of a method 1000 of the present invention. Note that although various activities are presented in a numbered sequence, and are connected with arrows to an exemplary embodiment of method 1000, there is no general requirement that the activities be performed in any particular order or any particular number of times, or that all activities, be performed. Moreover, any activity can be performed automatically and/or manually.

At activity 1100, real-time measurement data for a telephone network between a transit carrier and a predetermined terminating carrier can be requested.

As used herein, the phrase "real-time" means within 0 to 15 minutes, inclusive of each time therebetween, such as for example, 11.2 minutes, 5 minutes, 4.6 minutes, 3 minutes, 2 minutes, and/or 1.001 minutes, etc. of an occurrence of an event. As used herein, in the context of a telephone network, the term "measurement" includes a capacity condition and/or traffic performance metric. A real time measurement can represent a measurement taken at a discrete time and/or a statistic of such measurements, such as for example, a count, sum, running total, maximum, minimum, average, weighted average, moving average, sampled average, etc. As used herein, "real-time measurement data" can include a real-time measurement and/or a real-time measurement statistic; a country, state, political region, and/or geographical region to which a real-time measurement relates; an originating, transit, and/or terminating carrier and/or service provider to which a real-time measurement relates; and/or a date and/or time to which a real-time measurement relates.

As used herein, the term "network" can be a telephone, electricity, gas, fuel, steam, water, communications, and/or utility network. As used herein, the phrase "telephone network" can be a plain old telephone system ("POTS") network, a private telephone network, a cellular telephone network, and/or a Voice-over-IP network, etc. Moreover, the physical layer of the telephone network can include wired, optical, microwave, cellular, radio, and/or satellite links and/or circuits, etc. As used herein, the phrase "transit carrier" means a carrier of a telephone call across a single and/or network of links and/or circuits. As used herein, the phrase "terminating carrier" means a carrier that carries a call received from a transit carrier, to potentially as far as the called party. As used herein, the phrase "originating carrier" means a carrier of a telephone call that is provided to the transit carrier, and can potentially be directly connected to the calling party.

The real-time measurement data can be requested by any carrier. The request can be made, for example, by selecting an identification of real-time measurement data of interest from a list of potential real-time measurement data. The real-time measurement data can be selected, for example, for a particular destination country and/or terminating carrier. The requested real-time measurement data can be requested periodically, at any customizable predetermined time interval (such as every 15 minutes, 10 minutes, 5 minutes, 4 minutes, 3 minutes, 2 minutes, and/or 1 minute), and/or aperiodically.

At activity 1200, the real-time measurement data can be obtained by the transit carrier. This measurement data can be obtained from a network traffic management system, such as for example, the Worldwide Intelligent Network used by AT&T Corp. The real-time measurement data can be provided to a database that can be connected to a data server, such as a web-connected data server ("web server"). The real-time measurement data can be provided to the data server in any format, including HTML, and/or can be converted to any format, including HTML, at the data server.

At activity 1300, the real-time measurement data can be provided via a network, from the data server to a customer information device. The network can be a plain old telephone service (POTS) network, a public switched telephone network (PSTN), a private network, a wireless network, a cellular network, a local area network, the Internet, etc. The real-time measurement data can be provided, for example, via FTP over a wide-area network, using, for example, the FTP PUT command. The real-time measurement data can be provided periodically, at any customizable predetermined time interval (such as every 15 minutes, 10 minutes, 5 minutes, 4 minutes, 3 minutes, 2 minutes, and/or 1 minute), and/or aperiodically.

At activity 1400, the real-time measurement data can be rendered on the customer information device. As used herein, the term "render" means to make perceptible to a human. The real-time measurement data can be rendered in any of a number of formats, including in a tabular, graphical, video, and/or audio format. For example, a graphical format can be rendered that includes dynamic, animated, and/or colored elements, and can be provided as a chart (scatter, line, bar, pie, cluster, etc.). The real-time measurement data can be rendered periodically, at any customizable predetermined time interval (such as every 15 minutes, 10 minutes, 5 minutes, 4 minutes, 3 minutes, 2 minutes, and/or 1 minute), and/or aperiodically.

At activity 1500, the real-time measurement data can be monitored on the customer information device. Such monitoring can take place manually and/or automatically. For example, an originating carrier in Virginia can monitor what percentage of traffic carried by a particular transit carrier is flowing over satellite circuits to a terminating carrier serving the island of Martinique. The real-time measurement data can be monitored periodically, at any customizable predetermined time interval (such as every 15 minutes, 10 minutes, 5 minutes, 4 minutes, 3 minutes, 2 minutes, and/or 1 minute), and/or aperiodically.

At activity 1600, traffic can be routed and/or diverted based on the real-time measurement data. Continuing with the previous example, if the originating carrier determines that the percentage of traffic carried by the particular transit carrier over satellite circuits to Martinique is unacceptable, the originating carrier can initiate a switch of any desired portion of the traffic to another transit carrier. Typically, such a switch would effect future calls, but in some cases could effect existing calls.

Figure 2:
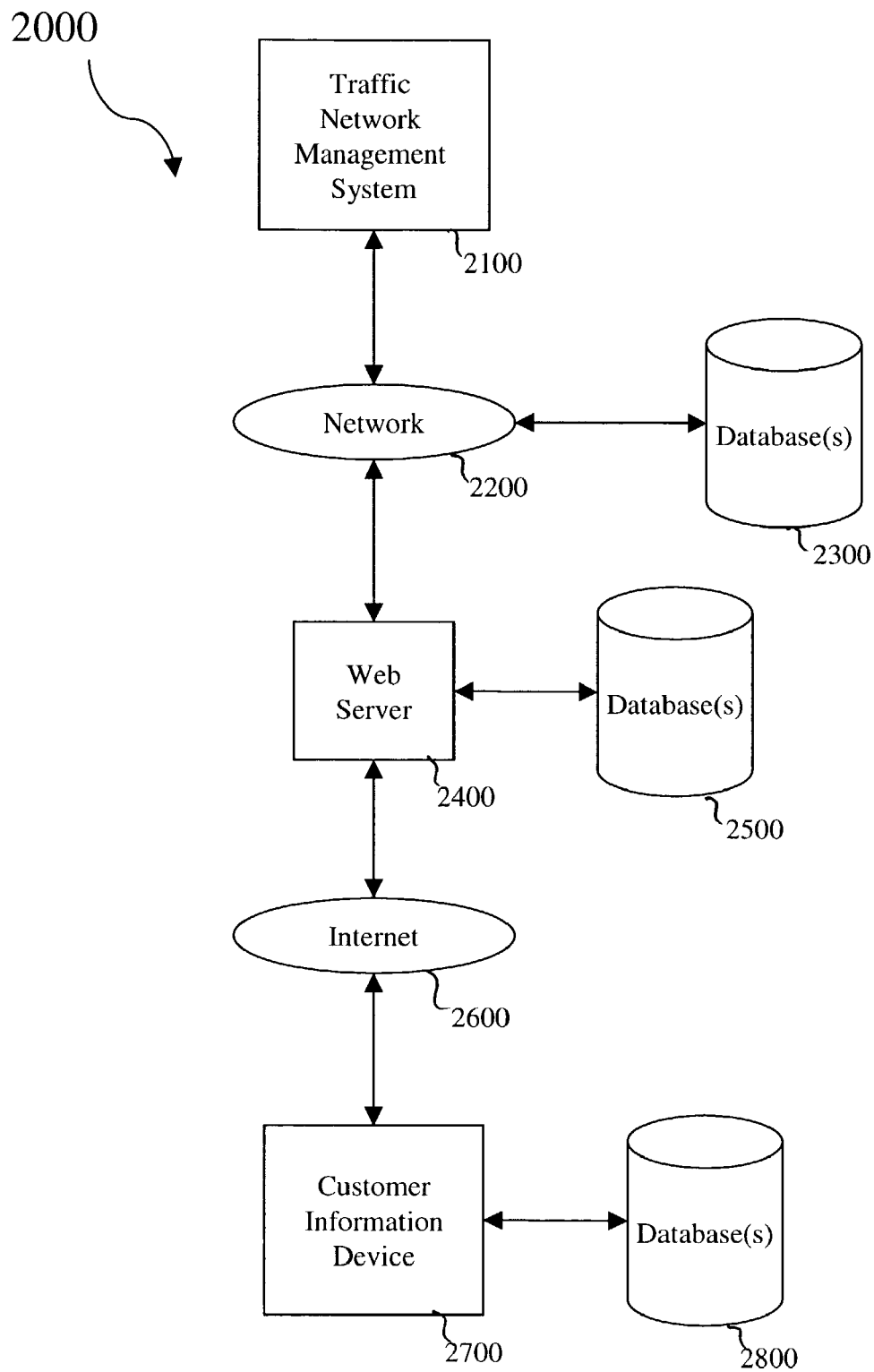
FIG. 2 is a block diagram of an exemplary embodiment of a system 2000 of the present invention.

FIG. 2 is a block diagram of an exemplary embodiment of a system 2000 of the present invention. As an initial matter, it suffices to say that, using the description of method 1000, one of ordinary skill in the art can implement the functionality of method 1000 via system 2000 utilizing any of a wide variety of well-known architectures, hardware, protocols, and/or software. Thus, the following description of system 2000 can be viewed as illustrative, and unless specified otherwise, should not be construed to limit the implementation of method 1000 and/or the scope of any claims attached hereto.

System 2000 can comprise a traffic network management system 2100, that can be coupled via a network 2200 to one or more databases 2300 and/or to at least one web server 2400, which can have a connected database 2500. Traffic network management system 2100 can obtain, process, store, and/or provide real-time measurement data automatically and/or as requested. Likewise, web server 2400 can request, obtain, process, store, and/or provide real-time measurement data automatically and/or as requested. Communications between traffic network management system 2100 and web server 2400 can be secure, encrypted, and/or validated.

Web server 2400 can be coupled via a network 2600, such as the Internet, to a customer information device 2700, which can have one or more databases 2800 connected thereto. In an exemplary embodiment, web server 2400 can utilize the Microsoft NT server technology.

Customer information device 2700 can request, obtain, store, process, and/or provide real-time measurement data automatically and/or as requested. To connect to network 2600 and/or web server 2400, customer information device 2700 can provide a userID and/or password. Communications between web server 2400 and customer information device 2700 can be secure, encrypted, and/or validated.

Either of networks 2200, 2600 can have any architecture, including a direct connection, a plain old telephone service (POTS) network, a public switched telephone network (PSTN), a private network, a wireless network, a cellular network, a local area network, a wide area network, an intranet, an extranet, the Internet, and/or a combination thereof, etc. Either of networks 2200, 2600 can be a packet-switched, a circuit-switched, a connectionless, or connection-oriented network or interconnected networks, or any combination thereof. Either of networks 2200, 2600 can be oriented toward voice, data, or voice and data communications. Moreover, a transmission media of either of networks 2200, 2600 can take any form, including wireline, satellite, wireless, or a combination thereof.

Figure 3:
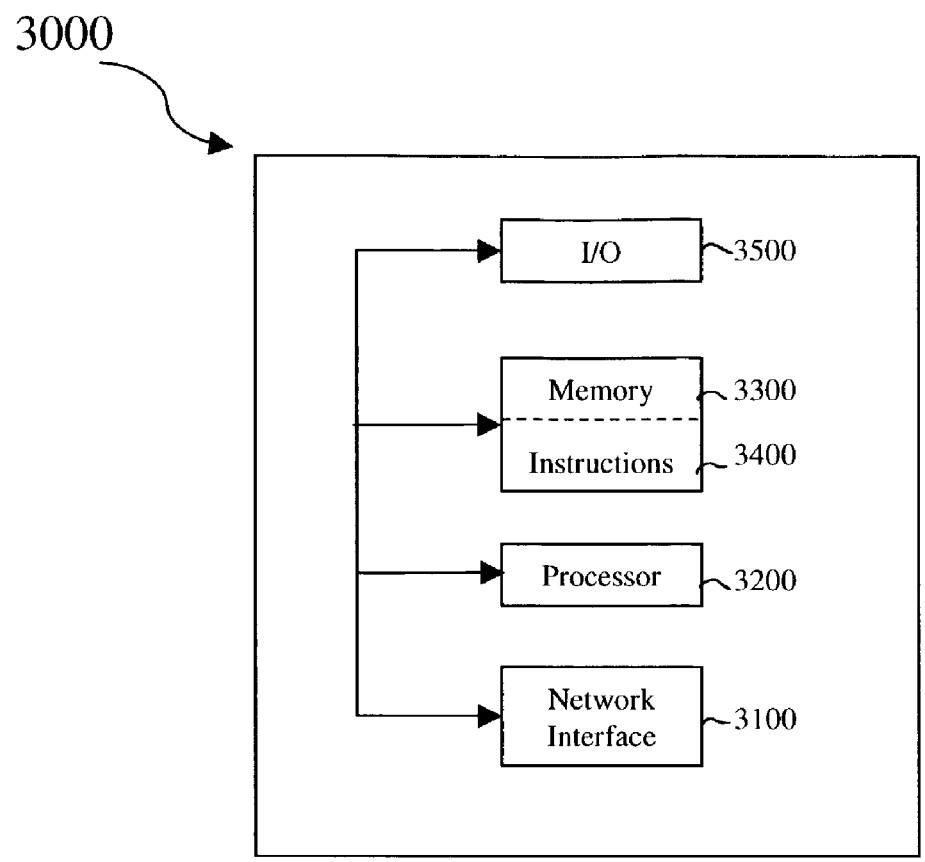
FIG. 3 is a block diagram of an exemplary embodiment of an information device 3000 of the present invention.

FIG. 3 is a block diagram of an exemplary embodiment of an information device 3000 of the present invention. Information device 3000 can represent any customer information device 2700, server 2400, and/or traffic network management system 2100. Information device 3000 can include well-known components such as one or more communication interfaces 3100, one or more processors 3200, one or more memories 3300 containing instructions 3400, and/or one or more input/output (I/O) devices 3500, etc.

In one embodiment, communication interface 3100 can be a bus, a connector, a telephone line interface, a wireless network interface, a cellular network interface, a local area network interface, a broadband cable interface, a telephone, a cellular phone, a cellular modem, a telephone data modem, a fax modem, a wireless transceiver, an Ethernet card, a cable modem, a digital subscriber line interface, a bridge, a hub, a router, or other similar device.

Each processor 3200 can be a commercially available general-purpose microprocessor. In certain embodiments, the processor can be an Application Specific Integrated Circuit (ASIC) or a Field Programmable Gate Array (FPGA) that has been designed to implement in its hardware and/or firmware at least a part of a method in accordance with an embodiment of the present invention.

Memory 3300 can be coupled to processor 3200 and can comprise any device capable of storing analog or digital information, such as a hard disk, Random Access Memory (RAM), Read Only Memory (ROM), flash memory, a compact disk, a digital versatile disk (DVD), a magnetic tape, a floppy disk, and any combination thereof. Memory 3300 can also comprise a database, an archive, and/or any stored data and/or instructions. For example, memory 3300 can store instructions 3400 adapted to be executed by processor 3200 according to one or more activities of a method of the present invention.

Instructions 3400 can be embodied in software, which can take any of numerous forms that are well known in the art. Instructions 3400 can control operation of information device 3000 and/or one or more other devices, systems, or subsystems.

Input/output (I/O) device 3500 can be an audio and/or visual device, including, for example, a monitor, display, keyboard, keypad, touchpad, pointing device, microphone, speaker, video camera, camera, scanner, and/or printer, including a port to which an I/O device can be attached, connected, and/or coupled.

Figure 4:
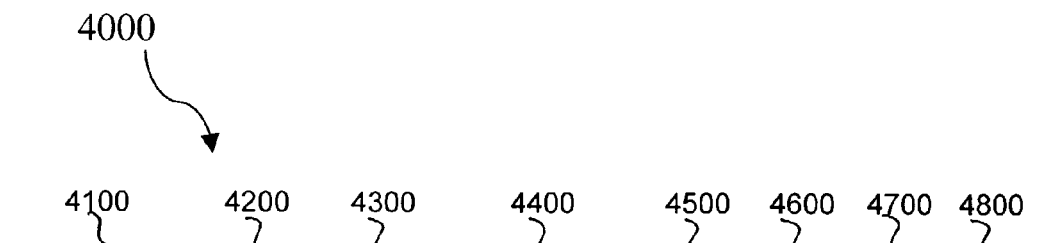
FIG. 4 is an illustration of an exemplary embodiment of a graphical user interface 4000 of the present invention.

FIG. 4 is an illustration of an exemplary embodiment of a graphical user interface 4000 of the present invention. Note that although presented as a tabular interface, graphical user interface 4000 can be rendered in any of a number of formats, including in a tabular, graphical, video, and/or audio format. Date column 4100 identifies the date that the real-time measurement data was obtained, stored, provided, and/or rendered. Similarly, time column 4200 identifies the time, such as in UTC, that the real-time measurement data was obtained, stored, provided, and/or rendered.

Carrier column 4300 identifies the transit carrier. Destination column 4400 identifies the destination country and/or termination carrier associated with the real-time measurement data. Real-time measurement columns 4500-4800 identify number of idle circuits and/or links, percent overflow, percent maintenance busy, and percent satellite, respectively.

The data for idle circuits can be related to an average number of circuits that are neither traffic busy or maintenance busy. The data for idle circuits can be related to an average of the toal circuits minus the occupied circuits, where the total circuits include two-way circuits and one-way outbound, circuits. The data for overflow can be related to a percentage of overflowed calls with respect to total call attempts from the transit carrier to the terminating carrier. The calls considered can include inbound, outbound, international, local, transit, and/or terminating, etc.

The data for maintenance busy can be related to a percentage of maintenance busy circuits with respect to total circuits from the transit carrier to the terminating carrier. The data for satellite can be related to a percentage of satellite circuits with respect to total circuits from the transit carrier to the terminating carrier.

In certain embodiments, a user can sort by any column. In certain embodiments, if a value of any measurement is outside a predetermined value and/or range, a user can receive a notification, such as, for example, a dialog box, an alarm, a pager message, an e-mail message, a fax, and/or display of the measurement and/or measurement data in bold and/or a particular color, etc. In certain embodiments, the user can specify the parameters of the notification.

Figure 5:
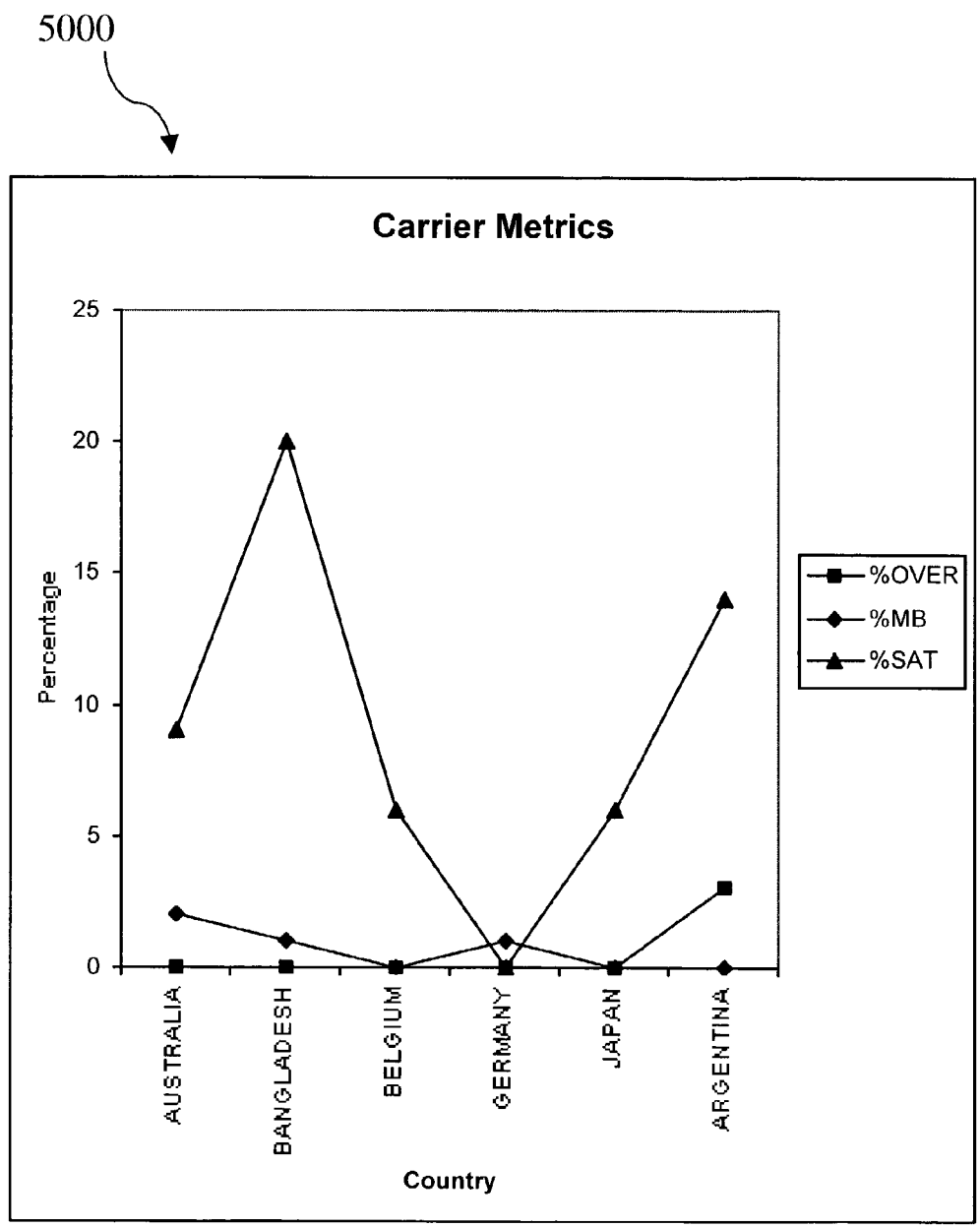
FIG. 5 is an illustration of an exemplary embodiment of a graphical user interface 5000 of the present invention.

FIG. 5 is an illustration of an exemplary embodiment of a graphical user interface 5000 of the present invention. As shown, certain data from FIG. 4 can be presented in a chart format. Specifically, percent overflow, percent maintenance busy, and percent satellite are presented by country. Note that any chart format can be used, including scatter, line, bar, pie, cluster, high-low, combination, etc.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A method, comprising:
   requesting real-time circuit performance metrics for a communications network between a transit carrier and a predetermined terminating carrier via a predetermined customer information device;
   automatically receiving the real-time circuit performance metrics via an internet at an originating carrier associated with the transit carrier so that the originating carrier can monitor the real-time circuit performance metrics, wherein the real-time circuit performance metrics are received by the predetermined customer information device; and
   routing traffic at direction of the originating carrier, and not by a user, through a different transit carrier if the real-time performance metrics are considered to be unacceptable, wherein the traffic is routed by the predetermined customer information device.

2. The method of claim 1, further comprising receiving a list of potential real-time circuit performance metrics.

3. The method of claim 1, further comprising identifying the real-time circuit performance metrics.

4. The method of claim 1, further comprising receiving a list of countries.

5. The method of claim 1, further comprising identifying a country of the terminating carrier.

6. The method of claim 1, further comprising receiving a list of terminating carriers.

7. The method of claim 1, further comprising identifying the terminating carrier.

8. The method of claim 1, further comprising monitoring the real-time circuit performance metrics.

9. The method of claim 1, further comprising routing traffic based on the real-time circuit performance metrics.

10. The method of claim 1, wherein the real-time circuit performance metrics are graphically rendered.

11. The method of claim 1, wherein the real-time circuit performance metrics are rendered in a tabular form.

12. The method of claim 1, wherein the real-time circuit performance metrics are related to telephone calls.

13. The method of claim 1, wherein the real-time circuit performance metrics are related to plain old telephone system telephone calls.

14. The method of claim 1, wherein the real-time circuit performance metrics are related to network capacity.

15. The method of claim 1, wherein the real-time circuit performance metrics are related to network traffic.

16. The method of claim 1, wherein the real-time circuit performance metrics are related to idle circuits.

17. The method of claim 1, wherein the real-time circuit performance metrics are related to overflow circuits.

18. The method of claim 1, wherein the real-time circuit performance metrics are related to traffic busy circuits.

19. The method of claim 1, wherein the real-time circuit performance metrics are related to maintenance busy circuits.

20. The method of claim 1, wherein the real-time circuit performance metrics are related to satellite circuits.

21. The method of claim 1, wherein the real-time circuit performance metrics are obtained via the Internet from a network operating system.

22. The method of claim 1, wherein the real-time circuit performance metrics are received via a web browser.

23. The method of claim 1, wherein the real-time circuit performance metrics are obtained at a predetermined time interval.

24. The method of claim 1, wherein the real-time circuit performance metrics are obtained at a customizable predetermined time interval.

25. A system, comprising:
- a predetermined customer information device configured to:
- request real-time circuit performance metrics for a communications network between a transit carrier and a predetermined terminating carrier;
- receive the real-time circuit performance metrics via an internet at an originating carrier associated with the transit carrier so that the originating carrier can monitor the real-time circuit performance metrics; and
- route traffic at direction of the originating carrier, and not by a user, through a different transit carrier if the real-time performance metrics are considered to be unacceptable.

26. A tangible computer-readable medium containing instructions for activities comprising:
- requesting real-time circuit performance metrics for a communications network between a transit carrier and a predetermined terminating carrier;
- automatically receiving the real-time circuit performance metrics via an internet at an originating carrier associated with the transit carrier so that the originating carrier can monitor the real-time circuit performance metrics; and
- routing traffic at direction of the originating carrier, and not by a user, through a different transit carrier if the real-time performance metrics are considered to be unacceptable.

27. A predetermined customer information device comprising a graphical user interface comprising a rendering of real-time circuit performance metrics for a communications network between a transit carrier and a predetermined terminating carrier, wherein the rendering is updated via an internet connection at a predetermined time interval, wherein an originating carrier monitors the real-time circuit performance metrics, and wherein the rendering displays routing traffic at direction of the originating carrier, and not by a user, through a different transit carrier if the real-time performance metrics are considered to be unacceptable.

* * * * *